United States Patent [19]

Ulsky

[11] 4,355,556

[45] Oct. 26, 1982

[54] VEHICLE TIRE RIM CORE REMOVER

[75] Inventor: Carl M. Ulsky, Lake Stevens, Wash.

[73] Assignee: KACA Corporation, Lake Stevens, Wash.

[21] Appl. No.: 186,498

[22] Filed: Sep. 12, 1980

[51] Int. Cl.³ .............................................. B26F 1/00
[52] U.S. Cl. ......................................... 83/124; 83/54; 83/128; 83/228; 83/251; 83/253; 83/569; 83/923
[58] Field of Search ................. 83/569, 51, 97, 104, 83/112, 123–128, 228, 251, 253, 914, 923, 925 R, 54

[56] References Cited

U.S. PATENT DOCUMENTS

| | | | |
|---|---|---|---|
| 373,943 | 11/1887 | Parker et al. | 83/112 X |
| 1,476,706 | 12/1923 | Furber | 83/51 X |
| 1,479,623 | 1/1924 | Overton | 83/569 X |
| 1,485,769 | 3/1924 | Curioni | 83/123 X |
| 1,746,998 | 2/1930 | Gamel | 83/39 |
| 1,781,398 | 11/1930 | Krause | 157/13 |
| 2,220,236 | 11/1940 | Haegele | 83/124 |
| 2,298,685 | 10/1942 | Davis | 82/100 |
| 3,109,337 | 11/1963 | Wise | 83/51 X |
| 3,279,289 | 10/1966 | Wendricks | 83/569 X |
| 3,364,526 | 1/1968 | Varady et al. | 19/82 |
| 3,389,626 | 6/1968 | Wise | 83/868 |
| 3,524,368 | 8/1970 | Goldman | 83/123 X |
| 3,838,492 | 10/1974 | Uemura | 429/403.3 |
| 3,922,942 | 12/1975 | Fawcett et al. | 83/51 |
| 4,090,670 | 5/1978 | Bennett | 241/23 |

Primary Examiner—James M. Meister
Attorney, Agent, or Firm—Christensen, O'Connor, Johnson & Kindness

[57] ABSTRACT

An apparatus for removing the wire-reinforced inside rim cores of automobile tires and the like so as to permit shredding for fuel or other use of the remaining carcass, such apparatus principally featuring axially aligned reciprocative action tubular cutters, associated tire positioning and centering mechanism including conjointly actuated centering arms, an annular tire support platform that yieldably supports the tire at a level initially above the lower cutter, and a centering cone member that precisely centers the tire as the upper cutter approaches cutting engagement with the tire, and further featuring an upper cutter assembly that carries a stripper that presses the severed or partially severed cores through the interior of the lower cutters and in the process thereof completes the severance of tire wall material over the edge of the lower cutter.

19 Claims, 9 Drawing Figures

VEHICLE TIRE RIM CORE REMOVER

FIELD OF THE INVENTION

This invention relates to an improved apparatus for removing the inner peripheral reinforcing rim cores of used automobile and truck tires and the like which are otherwise difficult to salvage because of the reinforcing steel cables embedded in such rim cores. The term "rim core" is herein applied to the thickened body of rubber and cord usually incorporating a reinforcing wire or cable that extends around the interior edge of each side wall of a tire opposite the tread surface of the tire. The invention is herein illustratively described by reference to the presently preferred embodiment thereof; however, it will be recognized that certain modifications and changes therein with respect to details may be made without departing from the essential features involved.

BACKGROUND OF THE INVENTION

A number of different efforts have been made heretofore to remove the reinforcing core cable from vehicle tires in conjunction with salvage operations. Most, if not all, of these have been complex, inefficient and slow to operate considering the necessary economics of mass processing huge stockpiles of used tires, such as for shredding as fuel at reasonable cost. Examples of prior art mechanisms are represented in the following U.S. Pat. Nos. 1,746,998; 1,781,398; 2,298,685; 3,364,526; 3,838,492; 3,922,942; and 4,090,670.

A broad object of the present invention is to provide a highly reliable, fast-acting and safe rim core remover efficient in operation and suitable for the mass production applications, such as those of the type mentioned.

A related object is to provide a rim core remover mechanism adaptable to operating on tires of different sizes and not requiring engaging and driving the tire in rotation relative to a cutter, nor of rotating a saw-type or rotable blade-type cutter during the rim core removal procedure.

Still another object hereof is to provide such an apparatus which has long life, is not especially sensitive to degree of sharpness of the cutters and lends itself to automated or semi-automated operation, with or without manual infeed of tires.

A further object of this invention is to provide a novel mechanism for cutting out a tire rim core with its reinforcing wire with minimum loss of surrounding wall rubber.

Still another objective is to provide such a rim core remover with automatic and reliable tire centering means making it unnecessary for a human operator to risk physical injury by placing his or her hands within the operating field of the dangerous moving parts of the apparatus. The mechanism itself is self-centering once the tire is placed on the infeed conveyor and the tire carcass and severed rim cores are automatically thereafter discharged on conveyors for disposal without human attention.

SUMMARY OF THE INVENTION

Each tire to be processed is placed in turn upon an input conveyor which advances the tire into position adjacent the cutter mechanism where it is pressed laterally into a holder means located between mutually opposed axially aligned annular cutters. The holder means includes a tire support platform, sets of normally retracted conjointly actuated arms that grip the tire tread surface from different directions to center the tire approximately, and means for more precisely centering the tire thereafter by the wedging action of an axially tapered conical member inserted into the central space within the tire. Such centering action occurs in advance of the upper cutter descending into cutting engagement with the upper tire wall.

Downward pressure of the upper cutter against the tire continues with the cutter edge teeth penetrating the rubber initially, followed by yielding of the support platform under the downward force of the upper cutter to permit contact of the tire with the lower cutter. As the upper cutter's teeth approach contact with those of the lower cutter, the support platform is retracted downwardly.

A sleeve-like stripper advanced downwardly behind the upper cutter continues its advance after the upper cutter reaches its full descent position of interengagement with the teeth of the lower cutter. In so doing, it presses the severed rim cores through the lower cutter. In the process of doing this it severs any remaining uncut webs of rubber and/or fabric or fine belting wires still connecting the rim cores in the tire walls and deposits the rim cores upon an off-bear conveyor.

Thereupon, retraction of the upper cutter, stripper and centering cone (the latter's retraction may occur earlier) occurs. Stop means are provided preventing the upper cutter frictionally gripped by the tire from lifting the tire off the support platform. Once the upper cutter is retracted, the tire still resting on the now reelevated support platform is ready to be expelled by the next incoming tire which undergoes a similar positioning process preparatory to cutting.

Automatic switching mechanisms, valves and pressure controls associated with the apparatus carry out the sequence of operations in timed, controlled manner based on movement and pressures as appropriate so that all an operator need do is place the tires to be processed on the infeed conveyor and monitor the ongoing operation of the machine.

These and other features, objects and advantages of the invention will become more fully evident from the following description by reference to the accompanying drawings illustrating the preferred form of the invention.

BRIEF DESCRIPTION OF THE DRAWINGS

FIGS. 3, 4 and 5 are respectively similar to FIG. 2 but with the parts respectively in progressively advanced stages of an operating cycle. In FIG. 3, the upper cutter is starting to engage the tire. In FIG. 4, cutting has occurred and the stripper is ejecting the severed rim cores. In FIG. 5, the upper cutter and stripper are being retracted and the tire is being held back (down) by the stop so that it will remain on or drop back upon the support platform.

DETAILED DESCRIPTION

In general terms, tires T successively delivered by infeed conveyor 10 for rim coring are in turn laterally inserted into the corer on an annular support platform 12. There each tire is slidably supported lying horizontally to be approximately centered in coaxial alignment with the vertically aligned coring cutters by means of conjointly actuated first and second pairs of gripping arms 14,16 and 18,20. These arms cooperably grip the tread surface of the tire at points in quadrature, spaced symmetrically about the central cutter axis A—A of the corer machine. Next, before or as cutter actuator cylinder 21 causes the upper tubular shaped cutter 22 to start its descent toward the cooperable similar lower cutter 24, more precise axial centering of the tire is achieved. This is accomplished by an axially movable centering cone 26 that advances ahead of the upper cutter and that wedges itself down into the center opening of the tire, the degree of penetration through the tire opening depending upon its size in relation to cone dimensions. In so doing, the centering cone, urged with a force that is limited by preestablished air pressure in cylinders 28 and 30, also presses the tire down against the centrally open support platform 12. The cone thereby holds the tire firmly centered to be engaged thereafter first by the descending upper cutter 22. In order for the tire to be pressed down into cutting engagement with the lower cutter, the increasing downward pressure exerted by the upper cutter 22 must first overcome the more moderate force of air pressure in the cylinders 32 and 34 normally maintaining the tire support platform 12 in its upper tire receiving support level. Also, as the teeth of the opposing cutters are approaching mutual contact, a switch is engaged by the descent position of the upper cutter to initiate retraction of the centering core and downward retraction of the support platform, the latter motion thereby allowing full utilization of the lower cutter teeth. At the point where the upper cutter reaches its lowermost position, increase of pressure in cylinder 21 is sensed, thereby initiating action of cylinder 56 to advance the stripper sleeve 36, the latter being slidably mounted between the cylindrical upper portion of the centering cone body 26 and the upper cutter 22. Thus, the stripper continues its downward movement after the upper cutter 22 reaches the lower limit of its cutting stroke. In so doing, the stripper sleeve forces completion of severence of the rim cores T$_c$ (FIG. 4) from the tire walls and forces the severed rim cores T$_c$ from the cutters and down through the chute opening 41 from which they drop onto the off-bear conveyor 45.

Figure 7:
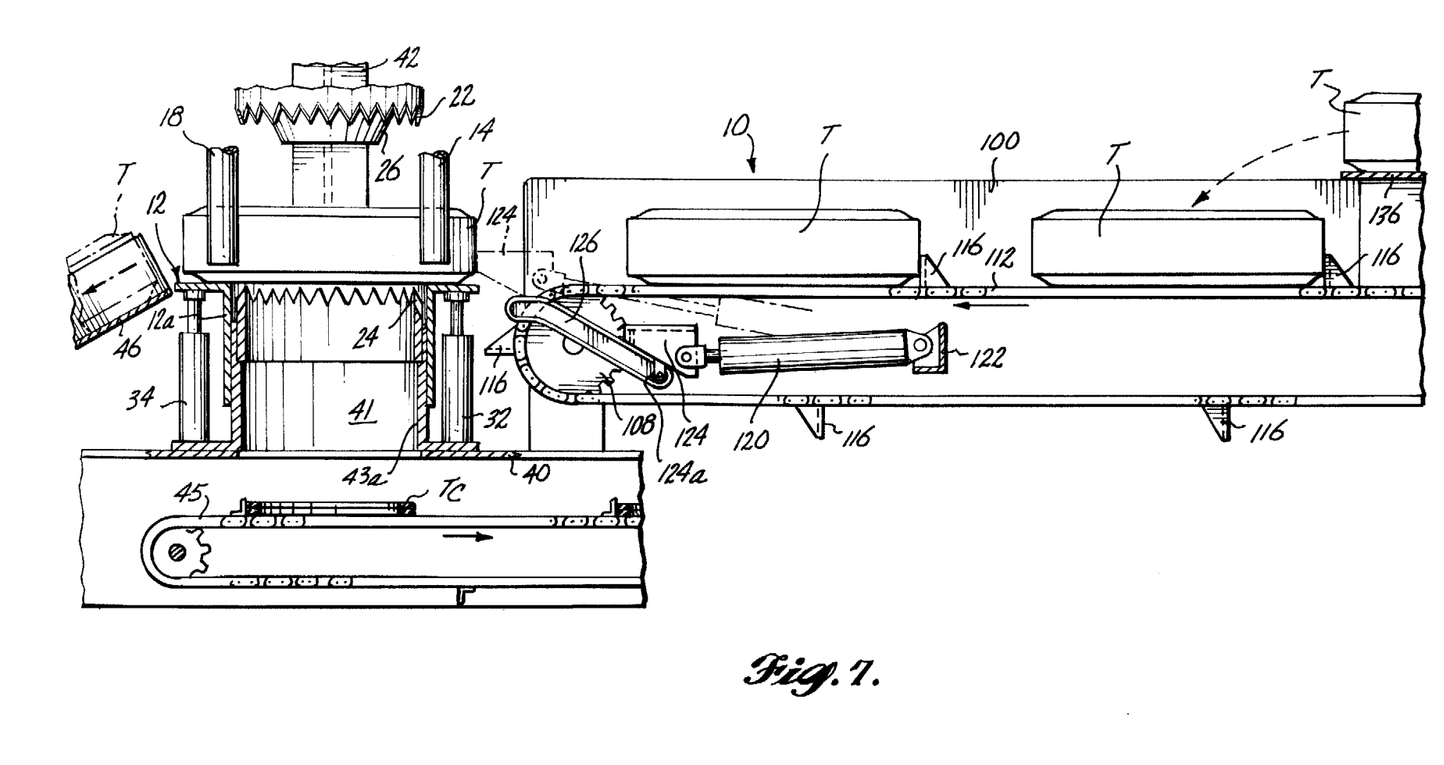
FIG. 7 is a side elevation view at 90° to the view shown in FIG. 1 depicting the infeed conveyor mechanism and the means for removing the cut cores as well as the cut carcass from the apparatus.
Figures 8, 9:
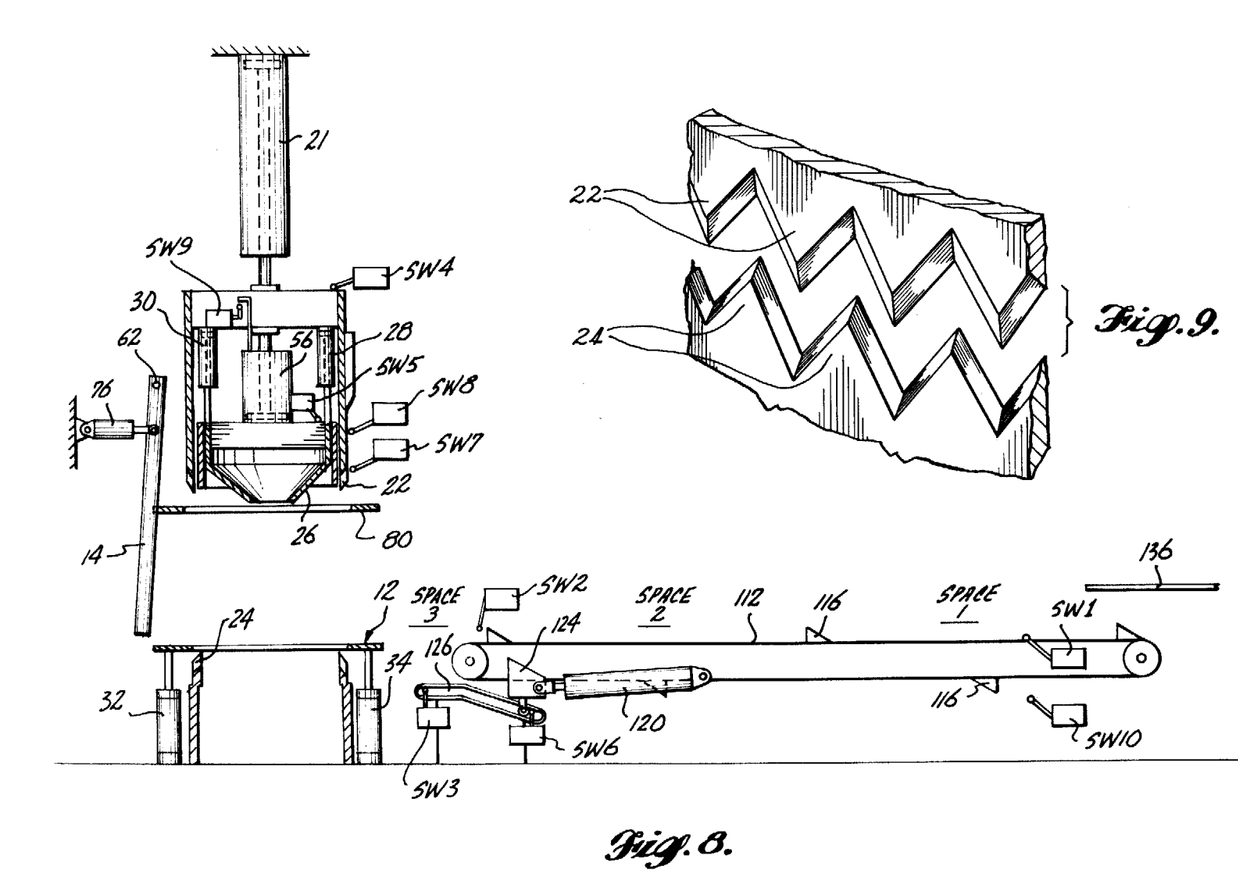
FIG. 8 is a simplified and partially schematic illustration depicting general placement and use of certain switches for control purposes.
FIG. 9 is a detail in perspective showing the preferred form of the cutter teeth.

Thereafter tubular stripper 36, and the upper cutter 22 are retracted upwardly to their respective starting positions. Platform 12 is reelevated by air cylinders 32 and 34, thereby releasing the tire from the lower cutter 24. Annular stop 80 prevents rise of upper cutter 22 from lifting the tire from platform 12 more than momentarily. The decored tire carcass is thus in position to be shoved onto the delivery chute 46 by the next oncoming tire received on the platform from the infeed conveyor 10 (FIG. 7).

These and related functions and the elements that perform them, together with associated portions of the machine and aspects of its control, will now be further described with continuing reference to the same drawings.

The base frame of the machine includes a pedestal 40 with upright H section columns 42 at opposite sides interconnected at the top by a beam member 44. An annular footing member 43 rests upon the pedestal 40 and includes a tubular sleeve 43a over which the guide sleeve 12a of the tire support platform member 12 fits slidably. Pneumatic jacks or cylinders 32 and 34 interposed in upright positions between base 43 and platform 12 are continuously supplied with air under preestablished pressure sufficient to maintain platform 12 in its normally upraised position to receive and support a tire for rim coring.

Beam 44 serves as the support for dependent axially mounted hydraulic cylinder 21, the piston rod of which is connected to the cutter carrier crosspiece 35 in order to raise and lower the upper cutter assembly and associated components vertically along central axis A—A. Principal guidance for such movement of the cutter assembly is derived from parallel, opposing V-shaped vertical tracks 50 and cooperating V-shaped sliders 52 engaging those tracks and interconnected by crosspiece 35. Tracks 50 are rigidly supported by side arms 51 cantilevered inwardly from the columns 42.

Upper cutter 22 has a hardened lower cutting edge of annular shape which is externally chamfered around its periphery and which is serrated in a sawtooth configuration with tooth edges beveled. Cutter 22 is mounted on a support sleeve 22a that in turn is fastened to the V-section sliders 52 to be guided for positive downward and upward actuation by upper hydraulic cylinder 21.

Within the upper cutter sleeve 22 is reciprocatively mounted a hollow downwardly tapered centering cone member 26. This member forms a downward extension of an upper tubular cylindrical sleeve 26a supported to be raised and lowered by the connecting rods 31 extending downwardly from the piston rods of air cylinders 28 and 30. The upper ends of air cylinders 28 and 30 are mounted on carriage bar 35. Thus, the centering cone 26 can be lowered by operation of the pneumatic cylinders 28 and 30 with the carriage bar 35 still elevated and can be elevated with the carriage bar 35 lowered.

In the annular gap between the centering cone member 26-26a and the upper cutter 22 there is a tubular stripper 36, as previously described. Stripper 36 is raised and lowered in relation to the centering cone member and the cutter 22 by a second hydraulic cylinder 56 mounted dependingly from the underside of crossbeam 35 in coaxial alignment with the cylinder 21. The casing of cylinder 56 is connected to the stripper 36 by means of a T-shaped member 58, such that the stripper may be forcibly moved downward during or after the upper cutter 22 is completing its downward stroke by action of the primary upper cylinder 21, as previously indicated.

Figure 1:
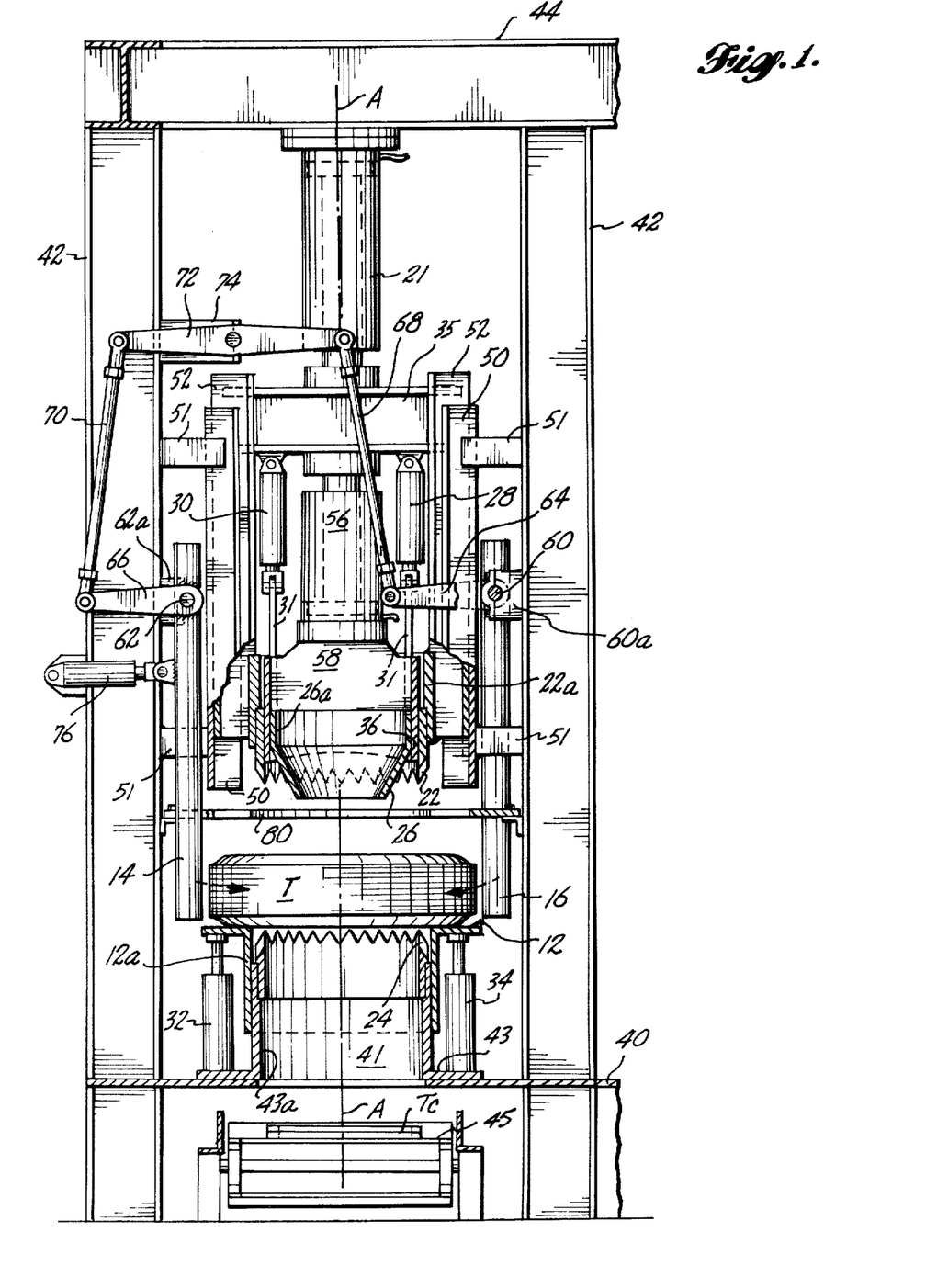
FIG. 1 is a side elevation view of the apparatus viewed in the direction of feed of tires into and removal of tire carcasses from the apparatus, the cutters and associated operating elements being shown in relatively retracted positions ready to receive a tire in this view.
Figure 2:
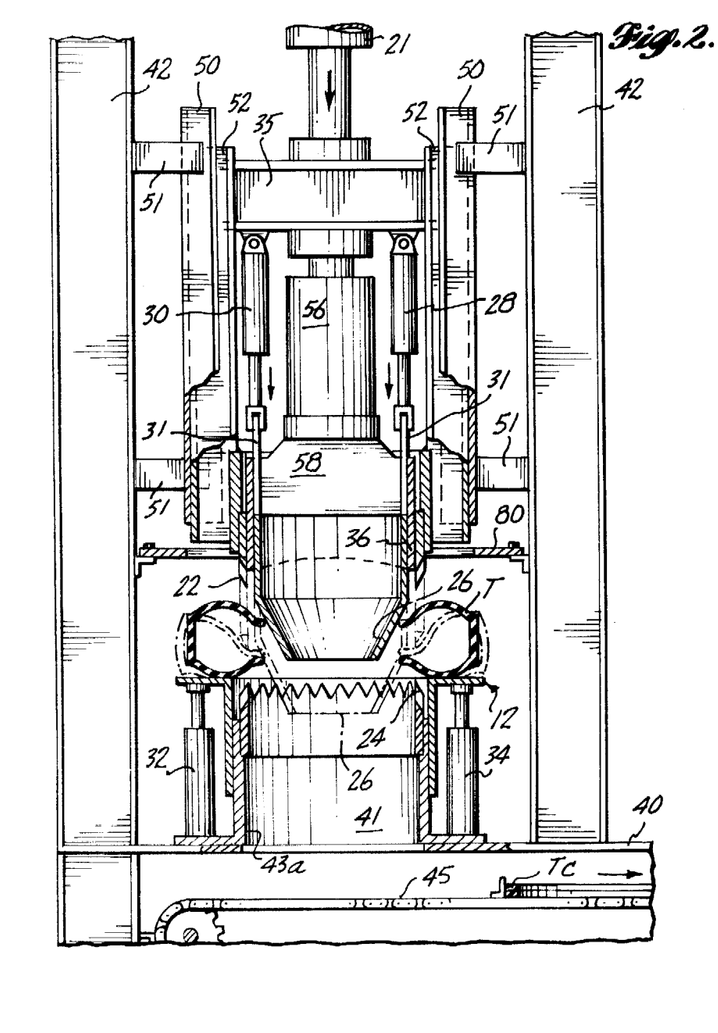
FIG. 2 is a partial side elevation view similar to FIG. 1 and at smaller scale illustrating the cutter mechanism and centering cone mechanism in the earlier part of the operating stroke.
Figure 3:
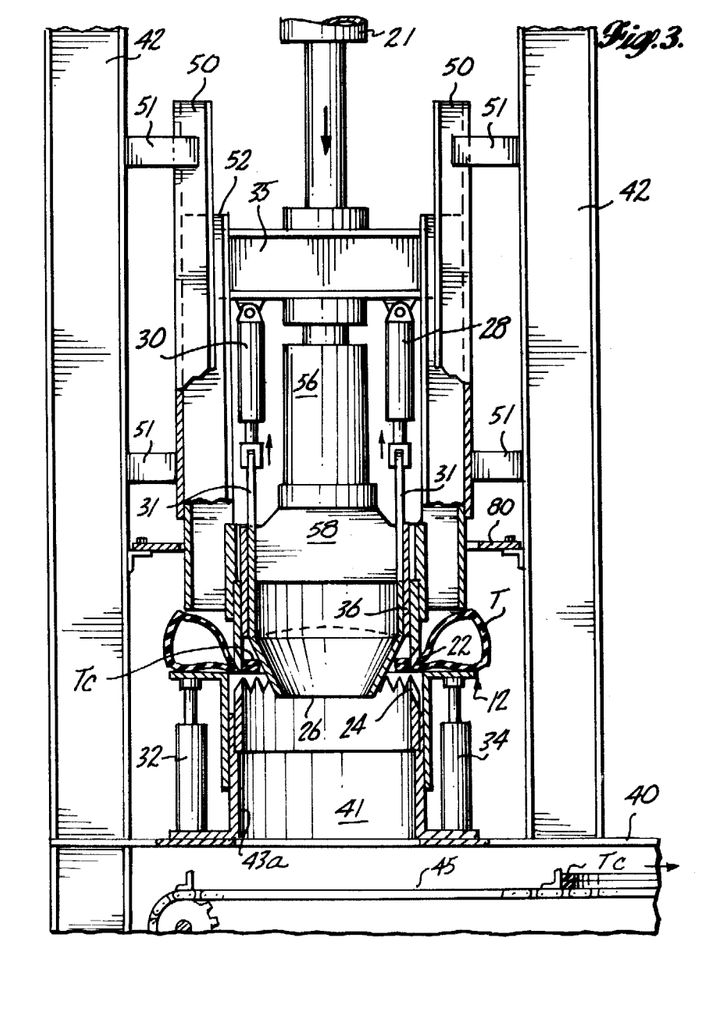

Of the three main operating components of the upper carriage assembly, including centering cone 26, cutter 22 and stripper 36, the stripper is maintained retracted above the other two and is preferably retained there during descent motion of the upper cutter. The centering cone itself, of course, is moved downward in advance of the cutter and may in fact normally project below the lower edge of the cutter as shown in FIG. 1. It is advanced ahead of the cutter for the purpose of assuring that the tire to be rim-cored is precisely centered in alignment with the cutter system on the axis A—A before cutter 22 firmly engages the tire. The controls effecting this action and the subsequent steps in the sequence will be further described below.

While on the subject of precise centering of the tire on the platform 12 before cutting starts, it has been mentioned that the centering arms 14,16 and 18,20 serve the initial or approximate centering function that occurs upon insertion of the tire laterally from infeed conveyor 10. To this end, the centering arms are formed in pairs. Arms 14 and 16 are supported near their upper ends on horizontal pivots 60 and 62 to swing about parallel axes spaced equally from and perpendicular to the central axis A—A. The arm pivots are supported by cantilevered mounting brackets 60a and 62a, respectively. Preferably, the swinging arms 14 and 16 are of tubular form, such as sections of pipe. In order that these arms may be actuated to move in unison equally and oppositely, arm 16 has a crank lever 64 projecting laterally from it and arm 14 has a similar crank lever 66 of equal length projecting laterally from it. These crank levers are rigid with their respective arms and have free ends pivotally interconnected by links 68 and 70 to the outer ends of a rigid straight lever 72 which is pivoted on a cantilevered support 74 midway between its ends. An air cylinder 76 connected to one of the arms, such as arm 14, is directed horizontally so as to swing that arm toward and from the arm 16, hence into and from contact with the tread surface of a tire T placed on platform 12. Because of the interconnections, however, arm 16 is constrained to swing equally and oppositely with arm 14. By similar mechanism, the pair of arms 18 and 20 are interconnected and actuated so as to operate equally and oppositely in unison. While the obvious options are not shown, this may be done (and preferably is done) with a single actuator 76 and a shaft interconnecting the arm sets, or by similar pneumatic jacks or cylinders 76 actuating the two pairs of arms through synchronously operated pneumatic control valves and a common source of pressurized air in order to center a tire approximately on the platform 12.

Platform 12 itself has been described briefly as a flanged sleeve member having a flat platform (flange) surface upon which a deposited tire can be slid around in order to center it on the axis A—A. The guide sleeve portion 12a of the platform 12 is slidably guided over a support tube 14a, as previously described, which also serves as a support for the lower annular cutter 24. Cutter 24 has a hardened upper cutting edge that is externally chamfered and that is bevel-toothed in the same manner and form as the upper cutter 22. Preferably, the teeth of the two cutters have the same pitch distance and the cutters are rotatively oriented such that the teeth of one register with the valleys of the other, that is, so that the teeth interdigitate to some extent in the completion of the cutting stroke.

Figure 4:
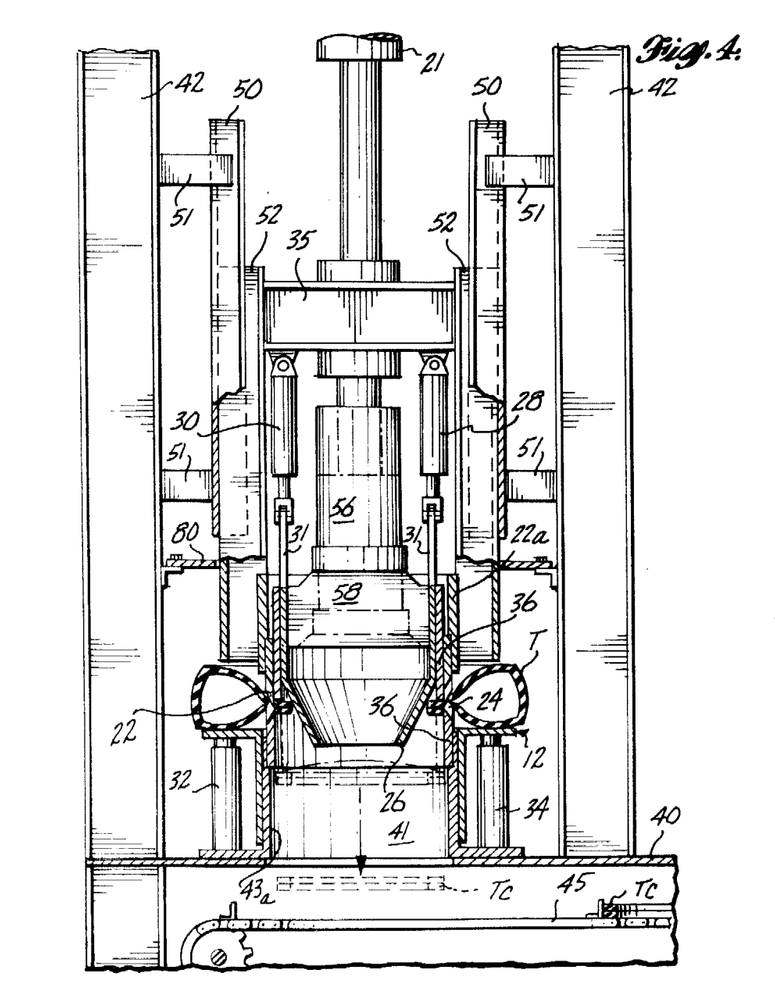
Figure 5:
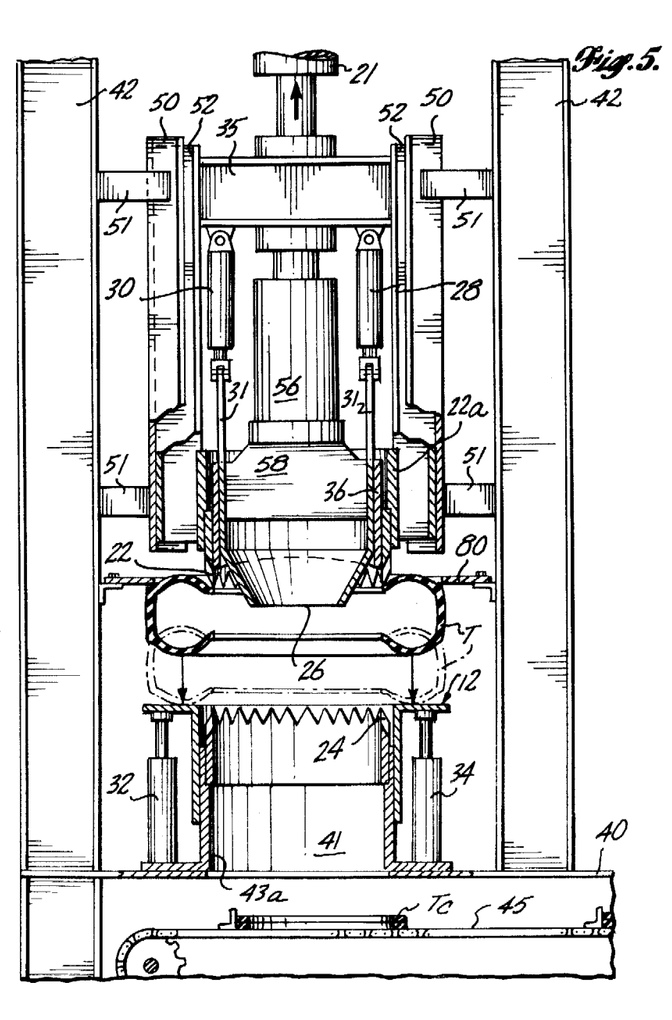
Figure 6:
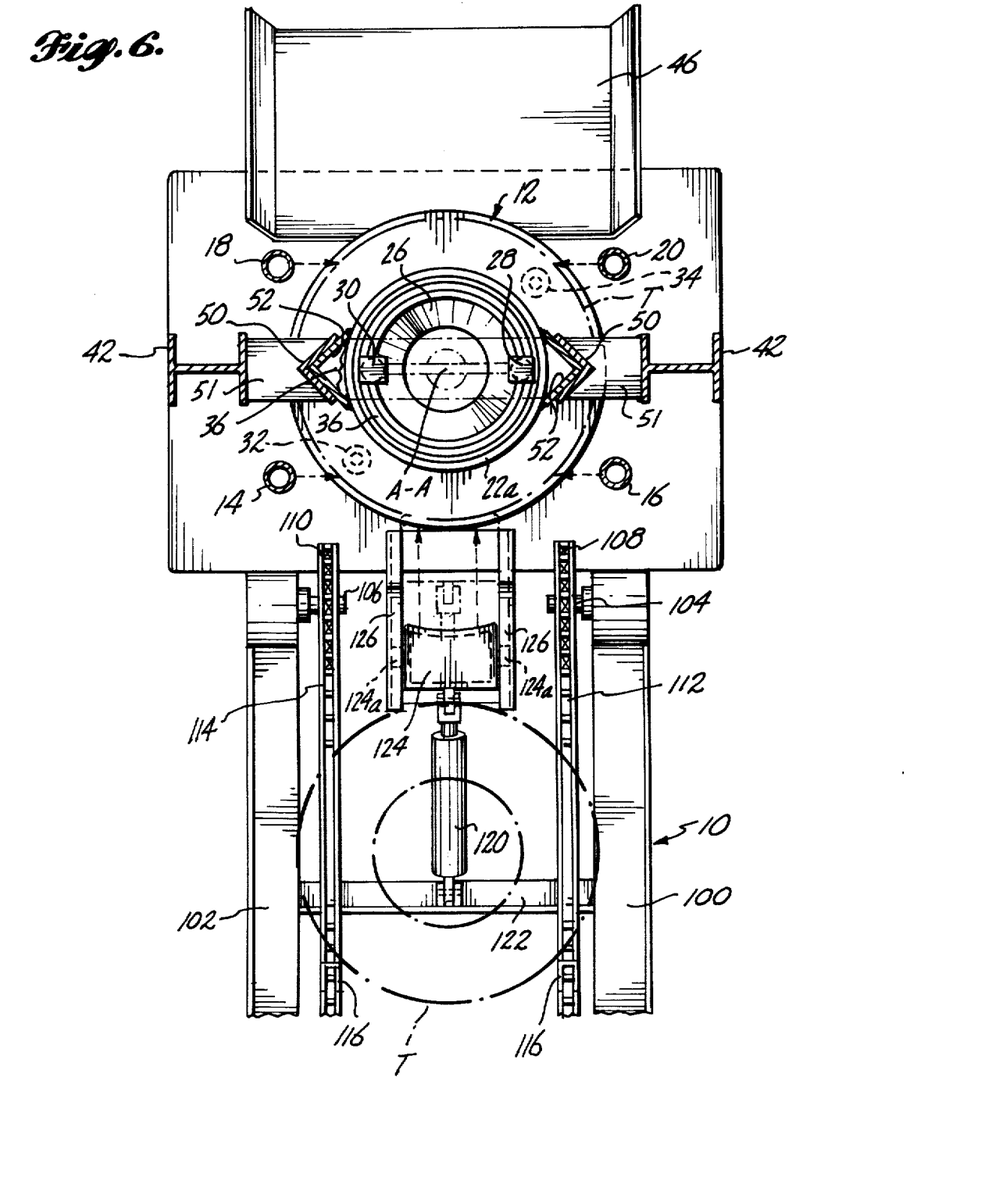
FIG. 6 is a simplified top view of the apparatus illustrating the tire infeed and carcass output conveyor.

However, because clearances are necessary and because wear can occur in the operation of such apparatus, also because some tires are more difficult to core cut than others, reliance is not placed upon complete severance of the tire cores by action of the cutters themselves. For this reason, and also to serve as an ejector of the severed cable reinforced tire rim cores, the stripper sleeve 36 also plays multiple roles. First, it reliably completes severance of the tire walls by its continued downward motion to a level below the level of the teeth of the lower cutter after the upper cutter has reached its lowermost cutting position. This breaks off any connective cord, belting wires or rubber tendons remaining uncut. Secondly, this continued downward motion of the stripper presses the severed rim cores downwardly to the point they are discharged down through the interior 42 of member 43a so as to drop onto the off-bear conveyor 45 as shown (FIGS. 1 and 4).

It will be observed in the operation of the machine that the stripper goes into action as the main upper cylinder 21 has reached or approaches the limit of its downward action on the upper cutter 22. The upper cutter 22 is at that point pressing at near its maximum cutting force against the walls of the tire being clamped and cut between the upper cutter and the lower cutter in the process of attempting to complete the severance of the rubber walls of the tire. In this effort, a rise of pressure develops in the upper cutter cylinder 21 due to cutter 22 coming to a virtual stop. This pressure increase is rather abrupt, is readily sensed by means (not shown) and is used as a trigger to valve hydraulic pressure into the lower cylinder 56 so as to start the stripper on its downward motion under the force of the hydraulic pressure within that cylinder. This is one means (others will be obvious) to time the stripper so that its action is caused to lag that of the upper cutter. The hydraulic system (not shown) is preferably one in which the same hydraulic pressure source is utilized to service cylinders 21 and 56. Conveniently it is preferred to use conventional bypass sequency valves in regular manner to expedite piston/cylinder actuation movement by transferring fluid from one end of the cylinder directly without necessity of all of the fluid passing through the system hydraulic pump. This and other conventional hydraulic and pneumatic design practices are optional in the control and operation of the systems involved, so will not be described nor illustrated in further detail.

The infeed conveyor 10 may, as shown, be either of the belt or chain type. Its framework includes side supports 100 and 102, each of which carries sets of shafts 104 and 106, the set nearest the cutter mechanism being shown and the other being omitted from the illustration. Each of these shafts supports a belt pulley or chain gear 108 and 110, depending upon whether the endless conveyor members 112 and 114 are endless belts or chains. These, in any case, are mounted in parallel relationship and carry sets of pusher brackets 116 designed to bear against the tread surface of a tire and advance it along the conveyors with the tire resting on the endless conveyor elements. As the tire approaches the support platform 12, its associated pushers 116 actuate a switch SW2 which in turn operates the hydraulic or pneumatic circuit that energizes a fluid cylinder 120 pivotally mounted on a transverse support member 122 mounted midway between the conveyor members 112 and 114. The piston rod of the fluid cylinder 120 is connected to a slider 124 guided by a member 124a in a track 126 that includes an initial upwardly sloped ramp and followed by a horizontal extension leading to the infeed side of the support platform. As the piston rod of the fluid cylinder 120 extends and the member 124 engages the tire and presses the tire forwardly, the tire advances at the level of the platform 12 until switch SW3 is actuated, whereupon the fluid circuit controlling the cylinder 120 reverses pressure in the ends of the cylinder and causes the cylinder to retract. The end of the retraction stroke is marked by actuation of switch SW6 at which the pusher member 124 lies below the plane of advance of the next tire moving toward the support platform 12 on the conveyors 112 and 114.

A switch SW1 senses the presence of a tire in position succeeding that next ready to be advanced onto the platform 12 from the supply deck 136. As a matter of preference in controlling operation of the system, the system will not operate unless switch SW1 is actuated by the presence of a tire overlying it.

To summarize the operating sequence and control functions of the illustrated embodiment of the invention, the support plate 12 is normally maintained in its upwardly extended position by preestablished air pressure maintained in the pneumatic cylinders 32 and 34 in order to receive and discharge tires. In order to start an operating cycle with the parts initially positioned as in FIGS. 1, 6, 7 and 8, switches SW4 and SW5 must be closed (complete retraction of hydraulic cylinders 21 and 56 achieve this). A tire must be placed on conveyor 10 in space 2 for original start-up. Then, by placing a tire in space 1, activating switch SW1 (with switches SW5 and SW6 closed), the conveyor operates to advance the first tire into space 3, whereupon switch SW2 is actuated and stops the conveyor drive; also initiates actuation of air cylinder 120 to press the tire onto platform 12 until switch SW3 is actuated. A previously cored tire lying on platform 12 is discharged by this same action, the incoming tire forcing it onto discharge chute 46.

Actuation of SW3 also activates air cylinder 76 to roughly center the tire on platform 12; also to retract air cylinder 120 until switch SW6 is actuated, whereupon retraction of this air cylinder is stopped and the cutting cycle is started. If necessary, a time delay in retraction of air cylinder 120 may be introduced through use of a flow restrictor in its operating air line in order to allow more time for the arm pairs to center the tire.

Cutting action is started by switch SW6 advancing air cylinders 28 and 30 and starting pressurization of upper cylinder 21. As a cam surface or other projection C on the side of upper cutter 22 engages switch SW8 (after about halfway through the upper carriage stroke), air cylinder 76 is retracted to retract the centering arms. The centering cone member 26 presses downwardly against the tire with limited pressure sufficient to center the tire. It therefore stops at whatever position it occupies in achieving that function, despite ongoing descent of the upper cutter carriage.

When the teeth of upper cutter 22 start cutting through the top wall of the tire, downwardly acting pressure is at first resisted by the air pressure in cylinders 32 and 34 holding the support plate 12 and thereby the tire above the lower cutter teeth. However, as downward cutter pressure builds up, the platform 12 yields downwardly and the teeth of the lower cutter 24 start penetrating the bottom side wall of the tire. As the opposing sets of teeth approach mutual contact, switch SW7 is actuated, causing the centering cone 26 retraction by reversal of pressures in air cylinders 28 and 30. Also, switch SW7 causes reversal of pressure in air cylinders 32 and 34 so as to retract the platform 12 downwardly and thereby permit full utilization (cutting action) of lower cutter 24.

Cutting by descent of upper cutter 22 continues until the cutter teeth are meshed, at which point there is an abrupt rise in pressure inherently occurring in upper cylinders 21. This rise of pressure (above a preset level) is sensed and utilized to pressurize stripper cylinder 56 so as to advance the stripper downwardly against the partially severed rim cores of the tire and presses the rim core material downwardly past the lower cutter teeth through the space within the lower cutter 24. In so doing, the stripper assures completion of the severance and it also presses the severed rim cores $T_c$ down onto the discharge conveyor 45. Preferably the lower edge of stripper 36 is nonplanar, i.e., is shaped as a double sinusoid or with opposite edge portions in one longitudinal axial plane more advanced than those in a perpendicular longitudinal axial plane so as to reduce the force required to actuate the stripper.

Hydraulic cylinders 21 and 56 continue to extend in their composite tandem cutting stroke until switch SW9 is actuated, and which thereupon reverses the pressures in both cylinders and initiates their conjoint retraction. At the interim point during such retraction, SW7 is allowed to reopen which causes reversal in air pressure in cylinders 32 and 34, thereby reelevating support platform 12 and freeing the tire casing from the lower cutter 24. The upper cutter carriage continues its retraction until switches SW4 and SW5 are reclosed, preparatory to starting a succeeding cycle of operation.

It will be evident to those skilled in the art that a number of the design details described and depicted in the illustrative and preferred embodiment of this invention are subject to variation depending upon designer's choice or the particular requirements of specific applications. In each case, however, the principles of the invention set forth in the claims that follow are not to be limited by specific details except as the claims themselves expressly require.

The invention including embodiments of the invention in which an exclusive property or privilege is claimed is defined as follows:

1. Apparatus for cutting the reinforcing rim cores out of used automotive tires and the like comprising:
    coaxially vertically aligned, cooperably formed upper and lower annular cutters having matched cutting edges extending substantially around their respective mutually adjacent inside peripheries,
    carrier means maintaining said cutters normally separated by a distance permitting lateral insertion and removal of a tire between the cutters,
    support means substantially surrounding the lower cutter for supporting a tire in horizontally disposed position inserted between the separated cutters and substantially in coaxial alignment with the cutters,
    carrier actuator means for said carrier means operable to move at least the upper cutter axially downward toward the lower cutter and into initial cutting engagement with the upper side of the supported tire for initiating severance of the rim cores from the carcass of such tire and thereafter to effect relative closure of the cutters substantially to sever the tire walls between the cutters,
    tire-engaging axially movable stripper means within the upper cutter and extending closely alongside its cutting edge,
    and stripper actuator means operable upon such relative closure of the cutters to press the stripper means downwardly against the upper rim core and force the rim cores downwardly into the interior of the lower cutter and in the process thereof complete the severance by shearing action on the tire walls along the lower cutter's cutting edge.

2. The apparatus defined in claim 1 wherein the tire support means comprises a platform, and centering means engageable with the tire supported on said platform and operable in advance of the upper cutter's downward movement to move the tire on said platform substantially into coaxial alignment with the cutters.

3. The apparatus defined in claim 2 wherein the centering means comprises conjointly actuated arms, and arm actuator means maintaining said arms normally retracted to receive a tire between them inserted on said platform, said arm actuator means being operable for moving said arms conjointly laterally inwardly against the tread surface of the tire in respectively different directions for coaxially aligning the tire with said cutters.

4. The apparatus defined in claims 2 or 3 including means yieldably maintaining said support platform normally elevated to receive and maintain a tire above the lower cutter, and wherein the carrier means advancing the upper cutter against the tire forces downward yielding of said support platform to permit the upper cutter to press the tire against the lower cutter.

5. The apparatus defined in claims 1 or 2 wherein the stripper means comprises an annular member coaxial with and reciprocatively relatively movable axially within one of the cutters between a relatively retracted position within the cutter and a relatively extended position projecting beyond the cutting edge of that cutter, and means for moving the stripper means relatively into its extended position, with the cutters interengaging the tire, thereby to complete the severance of the rim cores and separate the same from the cutters.

6. The apparatus defined in claims 1 or 2 wherein the stripper means comprises an annular member coaxial with and reciprocatively relatively movable axially within one of the cutters between a relatively retracted position within the cutter and a relatively extended position projecting beyond the cutting edge of that cutter, and means for moving the stripper means relatively into its extended position, with the cutters interengaging the tire, thereby to complete the severance of the rim cores and separate the same from the cutters, and wherein the annular member has a nonplanar leading edge whereby to exert a peripherably progressive shearing action by advancement of said annular member toward its extended position.

7. Apparatus for cutting the reinforcing rim cores out of used automotive tires and the like comprising:
coaxially aligned, cooperably formed annular cutters,
carrier means maintaining said cutters normally separated by a distance permitting lateral insertion and removal of a tire between the cutters,
support means for supporting a tire inserted between the separated cutters substantially in coaxial alignment with the cutters,
carrier actuator means for said carrier means operable to move at least one of said cutters axially toward the other cutter and into cutting engagement with the supported tire for severance of the rim cores from the carcass of such tire,
stripper means including an element engageable with the rim cores of the tire being severed,
and means for actuating said stripper means axially in timed relation with carrier means actuation to force the separation of the at least partially severed rim core from the tire carcass, said tire support means comprising a platform, said apparatus further comprising centering means engageable with a tire supported on said platform to move the tire substantially into coaxial alignment with the cutters and comprising an axially convergent centering wedging means coaxial with the cutters, means normally maintaining said wedging means retracted from the support platform to permit insertion of a tire thereon between the cutters, and means for advancing said wedging means axially through and into wedging engagement with the interior rim of the tire in advance of cutter engagement thereof.

8. The apparatus defined in claim 7 wherein the centering means further comprises conjointly actuated arms, and arm actuator means maintaining said arms normally retracted to receive a tire between them inserted on said platform, said arm actuator means being operable for moving said arms conjointly laterally inward against the tread surface of the tire in respectively different directions for coaxially aligning the tire with said cutters.

9. Apparatus for cutting the reinforcing rim cores out of used automotive tires and the like comprising:
coaxially aligned, cooperably formed annular cutters,
carrier means maintaining said cutters normally separated by a distance permitting lateral insertion and removal of a tire between the cutters,
support member for supporting a tire inserted between the separated cutters substantially in coaxial alignment with the cutters,
carrier actuator means for said carrier means operable to move at least one of said cutters axially toward the other cutter and into cutting engagement with the supported tire for severance of the rim cores from the carcass of such tire,
stripper means including an element engageable with the rim cores of the tire being severed,
and means for actuating said stripper means axially in timed relation with carrier means actuation to force the separation of the at least partially severed rim core from the tire carcass, said tire support means comprising a platform, said support platform having an opening therein coaxial with and slightly larger than the cutters, tire centering means comprising an axially convergent wedging means coaxial with the cutters, means normally maintaining said wedging means retracted from the support platform to permit insertion of a tire thereon between the cutters, and means for advancing said wedging means axially through and into wedging engagement with the interior rim of the tire in advance of cutter engagement thereof.

10. The apparatus defined in claim 9 including means yieldably maintaining said support platform normally elevated to receive and maintain a tire above the lower cutter, and wherein the carrier means advancing the upper cutter against the tire forces downward yielding of said support platform to permit the upper cutter to press the tire against the lower cutter.

11. The apparatus defined in claim 9 including means yieldably maintaining said support platform normally elevated to receive and maintain a tire above the lower cutter, and wherein the carrier means advancing the cutter against the tire forces downward yielding of said support platform as the cutters sever the tire rim cores, and further including pneumatic cylinder means yieldably maintaining the support platform in such normal position and operable to retract said support platform below such position by change of pressures in said cylinder means.

12. The apparatus defined in claim 9 including pneumatic cylinder means operable to exert limited pressure of downward advancement of the wedging means against the inside rim of a tire, thereby to permit centering of tires of different inside diameter by said wedging means.

13. The apparatus defined in claim 12 wherein the stripper means comprises an annular member coaxial with and reciprocatively relatively movable axially within one of the cutters between a relatively retracted position within the cutter and a relatively extended position projecting beyond the cutting edge of that cutter, and means for moving the stripper means relatively into its extended position, with the cutters interengaging the tire, thereby to complete the severance of the rim cores and separate the same from the cutters.

14. The apparatus defined in claim 9 wherein the stripper means comprises an annular member coaxial with and reciprocatively relatively movable axially within one of the cutters between a relatively retracted position within the cutter and a relatively extended position projecting beyond the cutting edge of that cutter, and means for moving the stripper means relatively into its extended position, with the cutters interengaging the tire, thereby to complete the severance of the rim cores and separate the same from the cutters.

15. The apparatus defined in claim 12 wherein the stripper means comprises an annular member coaxial with and reciprocatively relatively movable axially within one of the cutters between a relatively retracted position within the cutter and a relatively extended position projecting beyond the cutting dge of that cutter, and means for moving the stripper means relatively into its extended position, with the cutters interengaging the tire, thereby to complete the severance of the rim cores and separate the same from the cutters, and wherein the annular member has a nonplanar leading edge whereby to exert a peripheral progressive shearing action by advancement of said annular member toward its extended position.

16. The apparatus defined in claim 9 wherein the stripper means comprises an annular member coaxial with reciprocatively relatively movable axially within one of the cutters between a relatively retracted position within the cutter and a relatively extended position projecting beyond the cutting edge of that cutter, and means for moving the stripper means relatively into its extended position, with the cutters interengaging the tire, thereby to complete the severance of the rim cores and separate the same from the cutters, and wherein the annular member has a nonplanar leading edge whereby to exert a peripheral progressive shearing action by advancement of said annular member toward its extended position.

17. Apparatus for cutting the reinforcing rim cores out of used automotive tires and the like comprising:
coaxially aligned, cooperably formed annular cutters,
carrier means maintaining said cutters normally separated by a distance permitting lateral insertion and removal of a tire between the cutters,
support means for supporting a tire inserted between the separated cutters substantially in coaxial alignment with the cutters,
carrier actuator means for said carrier means operable to move at least one of said cutters axially toward the other cutter and into cutting engagement with the supported tire for severance of the rim cores from the carcass of such tire,
stripper means including an element engageable with the rim cores of the tire being severed,
and means for actuating said stripper means axially in timed relation with carrier means actuation to force the separation of the at least partially severed rim core from the tire carcass, said tire support means comprising a platform, means yieldably maintaining said support platform normally elevated to receive and maintain a tire above the lower cutter, centering means engageable with the tire supported on said platform to move the tire substantially into coaxial alignment with the cutters, and pneumatic cylinder means yieldably maintaining the support platform in such normal position and operable to retract said support platform below such position by change of pressures in said cylinder means, downward pressure of the upper cutter against the tire forcing downward yielding of the support platform as the cutters sever the tire rim cores.

18. The apparatus defined in claim 17 further wherein the centering means comprises conjointly actuated arms, and arm actuator means maintaining said arms normally retracted to receive a tire between them inserted on said platform, said arm actuator means being operable for moving said arms conjointly laterally inwardly against the tread surface of the tire in respectively different directions for coaxially aligning the tire with said cutters.

19. Apparatus for cutting the reinforcing rim cores out of used automotive tires and the like comprising:
coaxially vertically aligned, cooperably formed upper and lower annular cutters having matched cutting edges extending substantially around their respective mutually adjacent inside peripheries, said cutting edges comprising alternating peaks and valleys, the radially outer faces which are chamfered inwardly at an acute angle toward said cutting edges, and with the peaks of one cutter registering with the valleys of the other cutter,
carrier means maintaining said cutters normally separated by a distance permitting lateral insertion and removal of a tire between the cutters,
support means substantially surrounding the lower cutter for supporting a tire in horizontally disposed position inserted between the separated cutters and substantially in coaxial alignment with the cutters,
carrier actuator means for said carrier means operable to move at least the upper cutter axially downward toward the lower cutter and into initial cutting engagement with the upper side of the supported tire for initiating severance of the rim cores from the carcass of such tire and thereafter to effect relative closure of the cutters substantially to sever the tire walls between the cutters,
tire-engaging axially movable stripper means within the upper cutter and extending closely alongside its cutting edge,
and stripper actuator means operable upon such relative closure of the cutters to press the stripper means ownwardly against the upper rim core and force the rim cores downwardly into the interior of the lower cutter and in the process thereof complete the severance by shearing action on the tire walls along the lower cutter's cutting edge.

* * * * *